United States Patent
Shaikh

(10) Patent No.: US 9,237,139 B2
(45) Date of Patent: Jan. 12, 2016

(54) CONTROLLING ACCESS TO A SECURE RESOURCE BASED ON USER CREDENTIALS AND LOCATION

(75) Inventor: Imran Shaikh, Harrow (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1640 days.

(21) Appl. No.: 12/516,419

(22) PCT Filed: Nov. 2, 2007

(86) PCT No.: PCT/GB2007/004187
§ 371 (c)(1),
(2), (4) Date: May 27, 2009

(87) PCT Pub. No.: WO2008/065333
PCT Pub. Date: Jun. 5, 2008

(65) Prior Publication Data
US 2010/0031334 A1    Feb. 4, 2010

(30) Foreign Application Priority Data
Nov. 29, 2006    (GB) .................................. 0623842.2

(51) Int. Cl.
H04L 12/22    (2006.01)
H04L 29/06    (2006.01)
(Continued)

(52) U.S. Cl.
CPC ................ *H04L 63/08* (2013.01); *G06F 21/35* (2013.01); *G06F 21/43* (2013.01); *G07C 9/00103* (2013.01); *G07C 9/00142* (2013.01);
(Continued)

(58) Field of Classification Search
CPC .................................. G06F 21/31; G06F 21/45
See application file for complete search history.

(56) References Cited

U.S. PATENT DOCUMENTS

| | | | |
|---|---|---|---|
| 6,747,564 B1 | 6/2004 | Mimura et al. | |
| 7,092,943 B2 * | 8/2006 | Roese et al. | |
| 2003/0225893 A1 * | 12/2003 | Roese et al. | 709/227 |
| 2004/0148526 A1 | 7/2004 | Sands et al. | |
| 2004/0203748 A1 * | 10/2004 | Kappes et al. | 455/432.1 |
| 2004/0267551 A1 | 12/2004 | Yadav | |
| 2005/0091338 A1 | 4/2005 | De La Huerga | |

(Continued)

FOREIGN PATENT DOCUMENTS

WO    2004/071119 A1    8/2004
WO    2004/092961 A1    10/2004

OTHER PUBLICATIONS

International Search Report mailed Jun. 4, 2008 in PCT/GB2007/004187 and Written Opinion of the International Searching Authority.

(Continued)

*Primary Examiner* — Venkat Perungavoor
(74) *Attorney, Agent, or Firm* — Nixon & Vanderhye PC

(57) ABSTRACT

A system and method for controlling access to a protected network resource is provided. Access is controlled as follows. User credentials received with a request from a user for access to the protected network resource are checked against predetermined user information so as to authenticate the user; The request is made via a network access point located within a restricted area. The recorded location of the user is checked to determine whether the user is recorded as being within the restricted area. Access to the protected network resource is allowed if the user credentials are authenticated and the user is recorded as being within the restricted area. The user's network connection is monitored and, on detection that the user is disconnected from the network, the user is recorded as not located within the restricted area. Additional credentials are required from the user to support the user's request when the user is not recorded as being within the restricted area.

21 Claims, 2 Drawing Sheets

(51) Int. Cl.
- G06F 21/35 (2013.01)
- G06F 21/43 (2013.01)
- G07C 9/00 (2006.01)
- H04W 12/08 (2009.01)
- G06F 21/88 (2013.01)
- H04W 12/10 (2009.01)
- H04W 48/04 (2009.01)

(52) U.S. Cl.
CPC ............ H04L63/105 (2013.01); H04L 63/107 (2013.01); H04W 12/08 (2013.01); *G06F 2221/2151* (2013.01); *H04W 12/10* (2013.01); *H04W 48/04* (2013.01)

(56) References Cited

U.S. PATENT DOCUMENTS

| | | | |
|---|---|---|---|
| 2005/0105734 A1* | 5/2005 | Buer et al. | 380/270 |
| 2005/0213763 A1* | 9/2005 | Owen et al. | 380/270 |
| 2006/0080541 A1 | 4/2006 | Monaco et al. | |
| 2006/0277187 A1* | 12/2006 | Roese et al. | 707/9 |

OTHER PUBLICATIONS

Search Report dated Mar. 16, 2007 in GB0623842.2.
International Search Report for PCT/GB2007/004187, mailed Jun. 4, 2008.

* cited by examiner

CONTROLLING ACCESS TO A SECURE RESOURCE BASED ON USER CREDENTIALS AND LOCATION

This application is the U.S. national phase of International Application No. PCT/GB2007/004187 filed 2 Nov. 2007, which designated the U.S. and claims priority to Great Britain Application No. 0623842.2, filed 29 Nov. 2006, the entire contents of each of which are hereby incorporated by reference.

BACKGROUND AND SUMMARY

The invention is directed to network security and to a method and system for controlling access to a protected network resource.

Network security systems use a variety of "tokens" to establish the identity of a user trying to log-in or gain access to the network. Most commonly, these tokens will include a username and a secret password. However, passwords can become known to third parties through the user having inadvertently disclosed them, as a result of writing them down, from phishing or through interception. To increase security further one-time passwords generated by a small electronic device carried by the user may be used or a set of security questions with answers may be established by the user allowing the system to challenge the user before granting access. However, use of one-time passwords and security questions can become a burden on the user.

It has been suggested that security can be enhanced where access to a network is made inside a secure building or site by integrating the building access security system with the network security system. This could be particularly useful for wireless networks where a user's physical location is not defined. Many offices now support wireless access to corporate networks but the wireless field often extends beyond the physical boundary of the building providing an opportunity for unauthorised "snoopers" to access the corporate network.

According to such a system, a user log-in attempt is collated with the security check that is performed on people attempting to enter each secure site. For example, each secure site has one or more access control points, normally involving a security barrier, such as an automatic door or gate operated by a personal electronic identity card. A physical barrier may not always be required and may be replaced by a checkpoint; either automatic or, possibly, staffed by security personnel, allowing the user's identity card to be read before entering the secure site. These identity cards are electronic, in as much as they have the ability to store information related to the carrier of the card (i.e. the employee). The identity card may be of the "swipe" type (where a magnetic strip contains encoded data identifying the holder of the card). Alternatively, the identity card may be a "proximity" type wherein a semiconductor memory, or similar, contains data that is communicated to the electronics in the security barrier by a very low-range radio link.

Accordingly, for a user to log-in to the secure corporate network, they have first to pass through the building security barrier and, in the process, to identify themselves to the building access security system. The building access security system is linked to the network access system to allow this information to be shared.

A problem can arise where the building access control system does not require users to register on leaving the secure building or site (i.e. to swipe-out) or if a user manages to avoid the exit barriers, for example during a building evacuation exercise. This can weaken the effectiveness of using a record of building presence to support authentication of a user.

The present invention provides a method for controlling access to a protected network resource comprising the steps of: receiving a request and user credentials from a user via a network access point located within a restricted area for access to the protected network resource; checking the user credentials against predetermined user information so as to authenticate the user; checking whether the user is recorded as being within the restricted area; allowing the user access to the protected network resource if the user credentials are authenticated and the user is recorded as being within the restricted area; monitoring the user's network connection and on detection that the user is disconnected from the network, recording the user as not located within the restricted area.

According to a preferred embodiment, the method includes consulting an access control system for the restricted area as to whether the user is within the restricted area and recording the user's location accordingly.

According to a preferred embodiment, the method includes on detection that the user is disconnected from the network, overwriting the record of the user's location to indicate that the user is no longer within the restricted area.

According to a preferred embodiment, the method includes including establishing a database including information on the user's location and network authentication status in which checking whether the user is recorded as being within the restricted area includes checking the database.

According to a preferred embodiment, the method includes comparing the time of the recorded entry into the restricted area with the time of the request and allowing the user access to the protected network resource if the request occurs within a set time period after the recorded entry.

According to a preferred embodiment, the method includes requiring additional credentials from the user to support the user's request when the user is not recorded as being within the restricted area.

According to a preferred embodiment, the restricted area access control system records the user as having entered the restricted area following a successful challenge, in which the challenge consists of at least one of: verifying a physical security token; and verifying security information provided by the user via a terminal.

According to a preferred embodiment, the method includes detecting that the user is disconnected, receiving a new request for access and allowing the user access to the protected network resource if the user is recorded as re-entering the restricted area.

According to a preferred embodiment, the step of checking whether the user is recorded as being within the restricted area precedes checking the user credentials.

The present invention also provides an access controller for controlling access to a protected network resource: in which the access controller is arranged for connection to a network access point located within a restricted area; in which the access controller is arranged to receive a request for access to the protected network resource and user credentials from a user via the network access point and to check the user credentials against predetermined user information so as to authenticate the user; in which the access controller is arranged to check information from a restricted area access control system as to whether the user is recorded as being within the restricted area; in which the access controller is arranged to allow the user access to the protected network resource if the user credentials are authenticated and the user is recorded as being within the restricted area; in which the access controller is arranged to monitor the user's network connection and on detecting disconnection of the user from the network, the access controller is arranged to record the user as not located within the restricted area.

According to one aspect, the access controller comprises means for accessing storage for storing user status information, in which the user status information comprises: information from the restricted area access control system indicating that the user has registered their entry into the restricted area; information from an authentication system indicating that the credentials supplied by the user have been accepted; in which the access controller is arranged to update, upon detecting disconnection of the user from the network, the information from the restricted area access control system to indicate that the user has left the restricted area.

According to a further aspect, the information from the restricted area access control system indicating that the user has registered their entry into the restricted area derives from one of: the user passing an access control point to enter the restricted area; and the user communicating with the restricted area access control system via a terminal.

According to a further aspect, the access controller is arranged, upon determining that the user is not recorded as being within the restricted area, to require additional credentials from the user to support the user's request.

According to a further aspect, the access controller is arranged to record the time of the user's entry into the restricted area and the time of the request and to allow the user access to the protected network resource if the request occurs within a set time period after the entry. The present invention also provides a computer network comprising the access controller.

BRIEF DESCRIPTION OF THE DRAWINGS

To aid understanding of the invention, embodiments will now be described by way of example, with reference to the drawings in which.

DETAILED DESCRIPTION OF PRESENT EXAMPLE EMBODIMENTS

Figure 1:
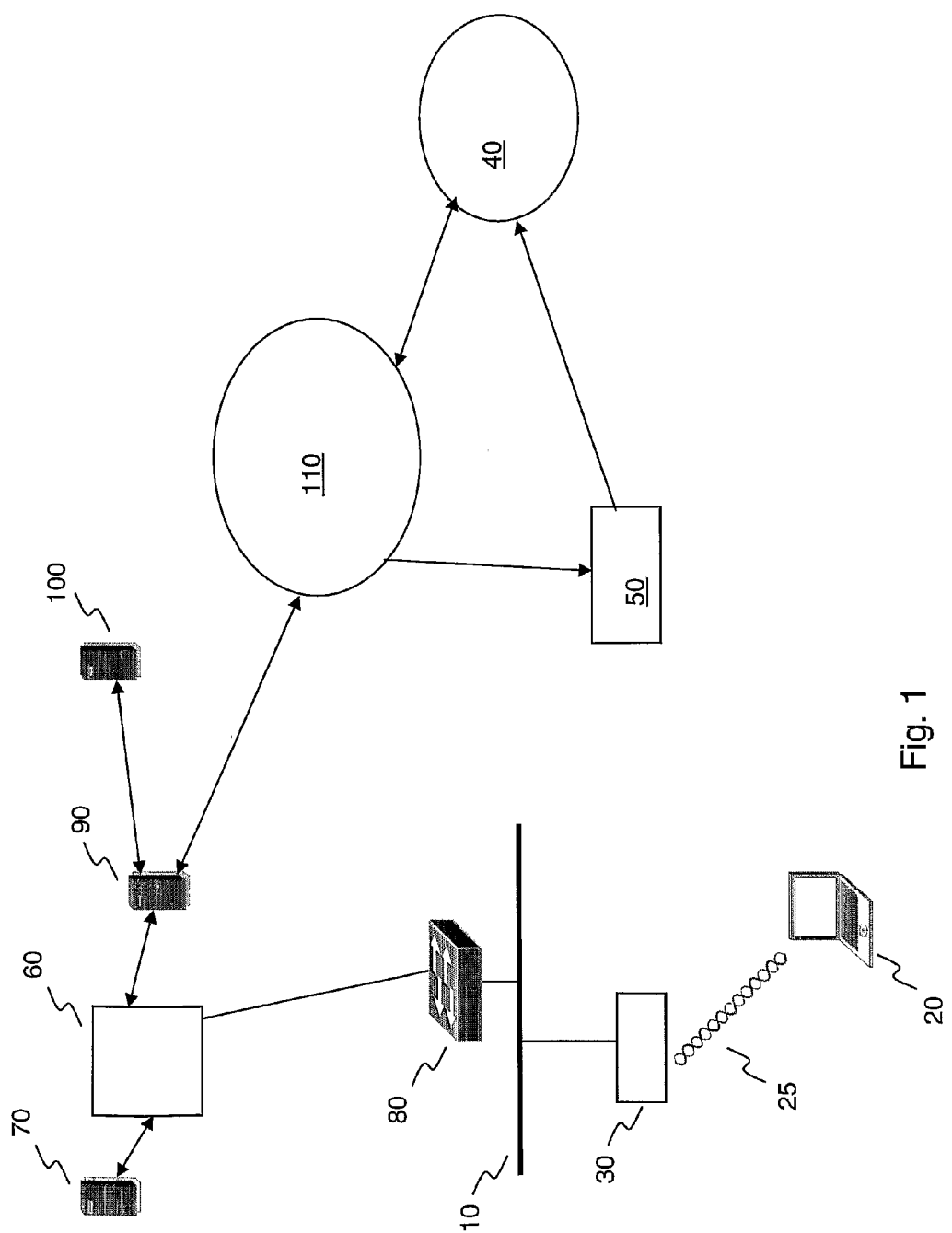
FIGS. 1 and 2 show block diagrams of systems for providing secure access to a network resource according to embodiments of the invention.

Referring to FIG. 1, the BASOL system 40 for providing access control cards and controlling physical access to BT buildings or other restricted areas is interfaced to a RADIUS (Remote Authentication Dial In User Service) security server 90, such as the Funk SBR RADIUS server, via the BT BATUV (Building Access Tracking and User Verification) system 110. The RADIUS server 90 also has access to an authentication directory 100 such as the Microsoft Active Directory or similar LDAP or relational database containing user information (known as credentials) allowing the system to reliably identify authorised users of the network.

Network Log-in

When a user attempts to log-in to the secure corporate network they are challenged to provide credentials (user name and password) which are passed to the RADIUS server 90. The RADIUS server 90 validates the credentials supplied by the user against corresponding details in the authentication directory using the IEEE 802.1X protocol. 802.1X defines a client-server-based access control and authentication protocol that restricts unauthorized devices from connecting to a network through publicly accessible ports. 802.1X controls network access by creating two distinct virtual access points at each port. One access point is an "uncontrolled" channel access point; the other is a "controlled" channel access point. All traffic through the single port is available to both access points. 802.1X authenticates each user device that is connected to a switch port and assigns the port to a VLAN before making available any services that are offered by the switch or the network. Authentication is achieved by the user's device passing the username and password credentials to the RADIUS server 90 over the controlled channel port.

The RADIUS server 90 then interrogates corporate active directory to verify the credentials provided by the user. In a conventional system, if these credentials are found to be correct, the user is authenticated and access is granted for the user to the network. In order to provide enhanced security, a check may be made with the building access security system to see if that user is recorded as having passed the building access security barrier to enter the building from which network access has been requested. With the enhanced security arrangement, the RADIUS server 90 grants access to the user to the secure corporate network only if the building access security system confirms that the user has passed the building security barrier and is currently deemed to be on site and the user-supplied credentials are authenticated.

A system to which the invention is applied will now be described in detail with reference to FIG. 1. In FIG. 1, secure, internal computer network 10 (i.e. a Ethernet-based local area network (LAN)) is provided in a restricted geographical area, such as a single building or a secure site to provide access to information and processing power, in the form of servers and network storage (not shown), to personal computers or similar devices allocated to individual members of staff. The LAN also allows the members of staff to communicate via their PCs with the PCs of other members of staff via the network. Connection to the LAN 10 may be via a wired connection (for example an Ethernet cable) or via a wireless link. In the figure a user terminal (Laptop 20) is connected via a wireless link 25 with network 10 via a wireless access point 30 (such as Cisco lightweight access point protocol—LWAPP). The user's laptop 20 is furnished with a suitable IEEE802.1X or Network Access Control (NAC) wireless client, such as the Odyssey client. This allows the user to communicate with the local network without having to be near a physical connection point.

Building Access Control

The building access control system is normally separate from the internal network system apart from a facility for allowing users to apply for access rights via the network. In the figure, the building access control system (BASOL 40) contains a database (not shown) of employees with access rights to that particular location (building or secure site). Each building or secure area is provided with an access control sub-system (zone management panel ZMP 50) which is connected to barriers (not shown) at each entry control point. Each employee with building access rights is issued with an access card that can be read by readers located at the security access barriers. The central building access control, BASOL 40, provides information determining building access rights, to each instance of ZMP 50 via a distribution system. When a user (e.g. an employee) attempts to gain access to a restricted location, they present their identity card for inspection by a card reader at the security barrier for that location. This card reader provides the information obtained from the user's card to the ZMP 50 local to the point of entry. Access to the building is granted by the ZMP 50 on detection of a suitably authorised card. If access rights are removed from a person, BASOL 40 forwards this information to ZMP 50.

The local access security system (ZMP 50) collects information on traffic passing through the building security barriers in their locality. This traffic may be in both directions (i.e. both entrance and exit information) or just entrance information in buildings where there is no control of exiting. ZMP 50 provides updated information on barrier traffic to the central building security server BASOL 40 at regular intervals, typically every 10 minutes. BASOL 40 therefore builds up a picture of who is in a particular building at any one time. In a similar manner, the central system BASOL 40 provides each local access security control system ZMP 50 with updates as to user's access rights via the distribution network.

Wireless Network Log-in

The log-in process for the user wishing to connect via a wireless link to the in-house secure corporate network will now be described. When the user first attempts to connect to the in-house network, they have to prove their identity in order to obtain access to the secure resources provided via the network. As stated above, the user connects via their device, e.g. laptop 20 to the local wireless access point 30. Wireless access point 30 makes the access point into a thin client containing no configuration or encryption keys. Configuration of the wireless access point is provided by network provisioning server 70 via enterprise wireless gateway 60 (such as Cisco wireless services module WiSM).

If a user attempts to access a WLAN in a building then a request (containing username and password credentials) is forwarded by the user's wireless client (e.g. Odyssey) from user's laptop 20 over wireless link 25 to wireless access point 30. The wireless link supports the EAP-TTLS (extensible authentication protocol-tunneled transport layer security) and Challenge Handshake Authentication Protocol (CHAPv2) to provide secure communications. EAP-TTLS is an encrypted protocol for creating a secure peer to peer tunnel using PKI certificates in known manner. CHAPv2 provides mutual authentication between peers in known manner. On receipt of the request, wireless access point 30 sends via local site access switch 80 an "EAP over RADIUS" request to RADIUS server 90 via Enterprise wireless gateway 60 in known manner.

Enterprise wireless gateway 60 centrally manages all the wireless access point's configuration and encryption keys, so that if the wireless access point was ever compromised (i.e. disconnected and replaced by a substitute), all connection to the corporate network would be blocked.

The user name and password credentials are presented by enterprise wireless gateway 60 to RADIUS server 90, which performs authentication by consulting corporate active directory (CAD) 100. If CAD authentication fails, then a "FAIL" RADIUS message is sent from RADIUS server 90 to access switch 80 and the user's device 20 is not allowed access to the corporate network 10. However, if the CAD authentication is successful, then the RADIUS server requests a second authentication.

According to the invention, a further function is provided—Building Access Tracking and User Verification (BATUV 110) to enhance security further while not increasing the burden on the user. Operating on an independent server platform, the BATUV system communicates over an internet protocol link with RADIUS server 90 and building access security system BASOL 40. BATUV 110 monitors information received from building access security system BASOL 40 and user log-in security function RADIUS server 70 to create a record for each user reflecting their history and security status. A database, the central validation repository (CVR) is provided as part of BATUV 110 for storing these records.

An illustration of a typical CVR is shown below. As shown below, each record in the CVR comprises a number of fields, as follows:

CVRID is a serial number;

UserName serves to uniquely identify the user within the organization;

Building name identifies the building or site from within which network access is requested (as defined by the known location of the wireless access portal 30);

WLAN Access indicates whether access to the protected network resources has been approved;

WLAN Count indicates the number of wireless network access attempts allowed per user;

Wired defines whether the request is via a wired or wireless connection;

SwipeCount records the number of times the user has passed the building security barrier to enter the building or site;

NetAuthTimestamp records the time of day of the most recent decision to authorise access for the user to the corporate network;

NetDisconnectTimestamp records the time of day of the most recently detected disconnection (including logging-out) of the user's terminal from the corporate network;

CardPIN records the personal identification number registered with the building access control system as associated with the user (this is a secret security code distinct from the user ID);

PINFailCount indicates the number of PIN-based access attempts allowed per user;

SwipeInTimestamp records the time of day of the most recent passage by the user of the building security barrier to enter the building or site;

SwipeOutTimestamp records the time of day of the most recent passage by the user of the building security barrier to exit the building or site;

SwipeSuccess records the number of successful attempts by the user to enter the building via the building security barrier.

Central Validation Repository Database

The username functions as an identifier of the user that is common to both network access system RADIUS server 90 and the building access system BASOL 40. Use of a common username allows BATUV 110 to link information relating to a particular user derived from these two security systems.

BATUV 110 also creates a record in further NADToBuilding database for each user reflecting their recorded location compared with the location of the network access point from which the request for network access was made. An illustration of typical NADToBuilding database records is shown below. As shown, each record in the NADToBuilding database comprises a number of fields, as follows:

NADToBuildingID is a serial number;

NADIP records a unique identifier for the network access point, e.g. the IP address allocated to it within the corporate network;

BuildingName records the name of the building or site to which the ZMP controls access;

ZoneName if the ZMP controls access to a specific section of a building or site, this is recorded here;

ReaderName if the ZMP controls access via a number of different entrances, the specific entrance at which the user attempts access is recorded here;

SecurityLevelID records the level of security clearance afforded to the user. For example, level 1 could provide access to open office areas only, level 2 to open office areas and restricted office areas, and level 3 to open and restricted office areas and meeting rooms;

BuildingID building ID code

EACSID defines the Electronic Access Control System used;

NetworkJoinTime defines the time period after "swipe-in" during which user authentication is allowed based on a minimal set of credentials.

SwipeInIdleTimeout defines the time period after "swipe-in" after which, if network access is not requested, CVR entry is deleted.

NetworkReconnectTimeframe defines the time period after a user disconnection is detected during which user authentication requires an additional credential, such as BASOL PIN. If the user does not successfully request access to the network during this period, the user's CVR entry is deleted.

Network Access Device to Building Cross-Reference "NADToBuilding" Database

If the user attempts to log-in to the corporate network and passes the CAD authentication stage, described above, a request will then be sent to BATUV to check whether that user is deemed to have passed the building security barrier and to be within the building. If the user fails the building access check, then connection to the corporate network is blocked.

The operation of BATUV 110 will now be described in detail by considering a typical attempt by a user to access the corporate network.

1) A user enters a building via the building security system barrier. ZMP 50 detects the user passing the barrier and updates its local records in a database local to the ZMP accordingly. BASOL 40 is updated by ZMP 50 at regular intervals;

2) The user attempts via their laptop 20 to connect to the corporate network 10 and the request is passed to RADIUS server 90;

3) First stage: RADIUS server 90 checks authentication with CAD 100, as described above. If the user is successfully authenticated, the second stage is entered.

4) Second stage: RADIUS server 90 passes details of the user's network access request to BATUV 110 which checks the user's building access status;

4a) The check on the user's building access status starts with a check by BATUV 110 on the CVR database, however database CVR may not be up to date as it is only updated from BASOL periodically;

4b) If no entry is found for the user in database CVR, BATUV checks with BASOL 40. To carry out the check, BATUV 110 uses the username supplied by RADIUS server 90 to interrogate building access security system BASOL 40 to see if that user is recorded as having entered the building via the building access security barrier.

4c) According to an alternative embodiment, if building access security system BASOL 40 does not contain an entry for that user, BATUV 110 will interrogate the local building access security system ZMP 50 directly in case the user has recently entered the building and the information relating to this has not yet passed to the central building access security system BASOL 40

5) If a suitable record of building access by the user is found by BATUV 110 in either BASOL 40 or ZMP 50, then database CVR is updated by incrementing the SwipeIn count and updating the SwipeInTimestamp with the time of the latest recorded building entry.

6) If a suitable record is found by BATUV 110 in any of the three places, referred to above (i.e. in CVR, BASOL or ZMP), a comparison is made between the valid SwipeInTimestamp value in CVR and the time of arrival of the request at BATUV 110 from RADIUS server 90. There are two cases, depending on the timing, as follows:

i) If the SwipeInTimestamp records a time of building entry that is within a set time period (say, one hour) before the time of the most recent user network log-in request received at BATUV 110, then BATUV 110 sends an "Accept" message to RADIUS server 90 to confirm the user's status as within the building and the user's record in database CVR is updated to record that access to the network has been approved (set "WLAN Access=Yes"), ii) If the SwipeInTimestamp records a time of building entry that precedes by more than the set time period, the time of the most recent user network log-in request received at BATUV 110, then BATUV 110 prompts RADIUS server 90 to request a further authentication token or tokens from the user, typically a personal identification number (PIN) such as the BASOL Card PIN. In response to the BATUV prompt, RADIUS server 90 prompts the user for the indicated further authentication token or tokens and, if successful, forwards the resultant token (e.g. PIN), as appropriate, to BATUV 110 which checks them against a preset value (e.g. against the CardPIN field in CVR). Continuing with the example of the BASOL PIN, if the PIN offered is not found in CVR, BATUV 110 sends a request to BASOL 40 for verification. If a correct BASOL PIN is offered by the user, as verified by either CVR or BASOL 40, then BATUV 110 sends an "Accept" message to RADIUS server 90.

7) In response to receipt of the "Accept" message from BATUV110, RADIUS server 90 grants the user access to the network.

According to a further embodiment, CAD authentication may take place after BATUV authentication. In this case, CAD authentication is prompted by receipt at RADIUS server 90 of an "Accept" message from BATUV 110 and access to the network only follows if CAD authentication is successful.

According to further embodiments, the CVR record of building presence is deleted when a user makes a network access attempt from a different building whether or not they have swiped out from the first building. This is so that a user can only ever be seen as being in a single building. Typically, the user is allowed three attempts to log in. If all three attempts are unsuccessful, the CVR and BASOL records of building presence are deleted. Deletion of these entries forces subsequent network access attempts to be backed up by a further successful authorisation at the security barrier (i.e. a recent BASOL Swipe in Time).

The following applies if the user has successfully logged-in to the network via a user device but subsequently disconnection of the device is detected.

8) Access switch 80 detects the user's device (Laptop 20) is no longer connected to the network: e.g. the user has logged off or the device has been physically disconnected, possibly due to loss of radio contact with wireless access point 30. RADIUS server 90 receives a "Stop Radius" message from access switch 80. RADIUS server 90 responds by issuing a message to BATUV 110 to record the time of receipt of the "Stop Radius" message in the Net- DisconnectTimestamp field in the user's CVR record. BATUV 110 also resets the WLAN Access field to "No".

9) There are two cases, depending on the timing, as follows:
   i) If a further request for network access is then received by RADIUS server 90 within a set time period (say two hours) of the network disconnect timestamp, where the user is recorded as not connected to the network (WLAN Access field set to "No") but the user is still deemed to be within the building (Swipe-In Count in CVR greater than zero), then RADIUS server 90 prompts the user via the wireless client for an enhanced set of credentials, for example: username and password, as before together with further authentication tokens, such as a PIN. If a valid, enlarged set of credentials is received, the NetAuthTimestamp field in database CVR is populated with the current time. Also in CVR, the WLAN Access flag is set to "Yes" and the NetDisconnectTimestamp entry is cleared.
   ii) If no further requests for network access are received within the set time period of the network disconnect timestamp, RADIUS server 90 will issue a command to BATUV 110 to delete the user's record in CVR. A new record will only be created following recording of a new entry by the user into the building by either BASOL 40 or ZMP 50.

10) If the building access control system requires users to register on exit (swipe-out), BATUV.110 is notified by BASOL 40 within a set time period (say 10 minutes) of detecting a swipe-out. BATUV 110 responds to a swipe out notification from BASOL 40 by deleting the user's record in CVR.

11) All CVR and BASOL database entries are deleted at Midnight; hence no record of swipe-in or network access requests are carried over to the next day and any devices still connected to the network at this time will get disconnected automatically.

BASOL Portal.

Figure 2:
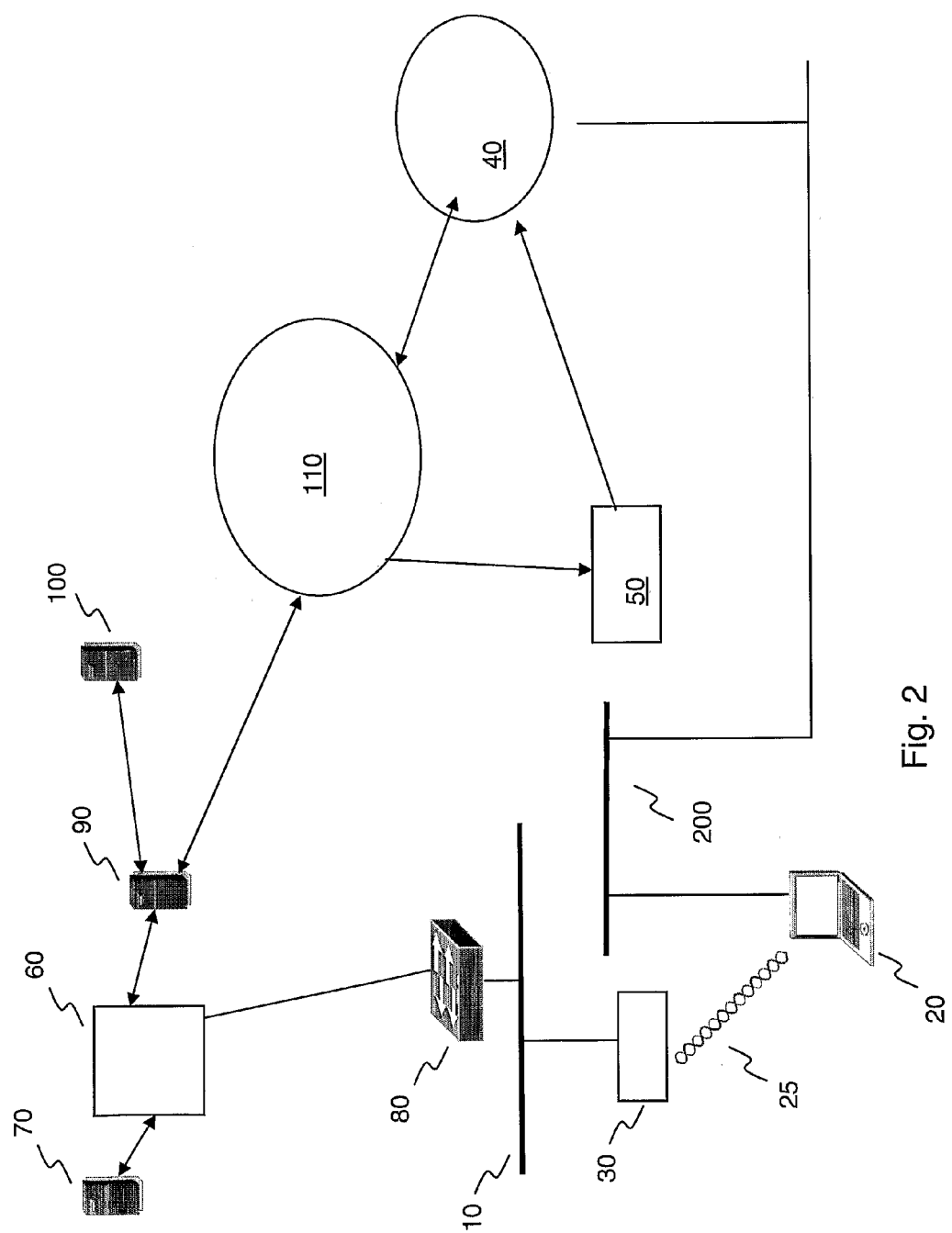

A system for remote registration with the building access control system BASOL 40 will now be described with reference to FIG. 2. FIG. 2 shows the system of FIG. 1 enhanced by inclusion of a backup LAN 200. Backup LAN 200 provides very restricted network access: at a minimum allowing the user to communicate with the BASOL system 40, i.e. to access the BASOL portal. Although shown for clarity as a physically separate network, backup LAN 200 may be implemented as a logically separate part of corporate network 10.

If the user request is rejected by RADIUS 90 or BATUV 110 and a "FAIL Radius" message is sent to access switch 80, the access switch 80 assigns the user device to the backup LAN 200. This gives the user restricted access to the BASOL Portal allowing the user to attempt to register with BASOL as an alternative to successfully passing the building security access barrier (effectively a logical swipe-in). The logical swipe-in is typically based on security questions generated by BASOL 40 that the user must answer correctly in order to prove their identity or other suitable security credentials. The BASOL portal provides a backup method for swiping-in, for example, if the user forgets their identity card.

Logical Swipe-Out

In a further alternative embodiment, at any stage where it is decided that the user should be deemed no longer to be in the building, BASOL 40 is instructed, by BATUV 110 or RADIUS server 90, as appropriate depending upon where the decision on the user's status is taken, to record the user as having swiped out.

According to further alternative embodiments, a suitable building access security token can include an identity card, as described above or another form of identification such as a biometric trait (fingerprint, iris, etc).

The invention is not limited to a particular form of building access control system and is applicable to a large system comprising a central and one or more local building access control systems or a simple single-barrier system with no separate central control (i.e. where the BASOL and ZMP of the above embodiments effectively merge).

Although described mainly with reference to a building access control system, the invention is equally applicable to access control of other secure locations, including a room, floor or other part of a single building, a collection of buildings or a campus.

Although the validation of a request to access a secure internal (e.g. corporate) network is described in the embodiment above as comprising the sequence of a CAD authentication check followed by a BATUV access check, the invention can equally be implemented with the alternative sequence in which the BATUV access check precedes the CAD authentication. Whereas the invention has particular application to wireless access networks, it is also applicable to wired connections and brings enhanced security to network connections in general.

According to further alternative embodiments, the functions of RADIUS server 90 and BATUV 110 may be merged or shared on a different basis to that described.

As will be understood by those skilled in the art, the invention may be implemented in software, any or all of which may be contained on various transmission and/or storage mediums such as a floppy disc, CD-ROM, or magnetic tape so that the program can be loaded onto one or more general purpose computers or could be downloaded over a computer network using a suitable transmission medium. The computer program product used to implement the invention may be embodied on any suitable carrier readable by a suitable computer input device, such as CD-ROM, optically readable marks, magnetic media, punched card or tape, or on an electromagnetic or optical signal.

Those skilled in the art will appreciate that the above embodiments of the invention are greatly simplified. Those skilled in the art will moreover recognise that several equivalents to the features described in each embodiment exist, and that it is possible to incorporate features of one embodiment into other embodiments. Where known equivalents exist to the functional elements of the embodiments, these are considered to be implicitly disclosed herein, unless specifically disclaimed. Accordingly, the spirit and scope of the invention is not to be confined to the specific elements recited in the description but instead is to be determined by the scope of the claims, when construed in the context of the description, bearing in mind the common general knowledge of those skilled in the art.

The content of the attached abstract is incorporated herein, as follows. A system and method for controlling access to a protected network resource is provided. Access is controlled as follows. User credentials received with a request from a user for access to the protected network resource are checked against predetermined user information so as to authenticate the user; The request is made via a network access point located within a restricted area. The recorded location of the user is checked to determine whether the user is recorded as being within the restricted area. Access to the protected network resource is allowed if the user credentials are authenticated and the user is recorded as being within the restricted area. The user's network connection is monitored and, on detection that the user is disconnected from the network, the user is recorded as not located within the restricted area.

Additional credentials are required from the user to support the user's request when the user is not recorded as being within the restricted area.

The invention claimed is:

1. A method for controlling access to a protected network resource comprising the steps of:
   receiving a request for access to the protected network resource and user credentials from a user connected to a network via a network access point located within a restricted area;
   checking the user credentials against predetermined user information so as to authenticate the user;
   checking whether the user is recorded as being within the restricted area;
   allowing the user access to the protected network resource if the user credentials are authenticated and the user is recorded as being within the restricted area;
   monitoring, using a computer, the user's network connection and on detection that the user is disconnected from the network, recording the user as not located within the restricted area.

2. A method as claimed in claim 1 including consulting an access control system for the restricted area as to whether the user is within the restricted area and recording the user's location accordingly.

3. A method as claimed in claim 2 including, on detection that the user is disconnected from the network, overwriting the record of the user's location to indicate that the user is no longer within the restricted area.

4. A method as claimed in claim 1 including establishing a database including information on the user's location and network authentication status in which checking whether the user is recorded as being within the restricted area includes checking the database.

5. A method as claimed in claim 1 including comparing the time of the recorded entry into the restricted area with the time of the request and allowing the user access to the protected network resource if the request occurs within a set time period after the recorded entry.

6. A method as claimed in claim 1 including requiring additional credentials from the user to support the user's request when the user is recorded as not being within the restricted area.

7. A method as claimed in claim 1 in which the restricted area access control system records the user as having entered the restricted area following a successful challenge, in which the challenge comprises one or more of: verifying a physical security token; and verifying security information provided by the user via a terminal.

8. A method as claimed in claim 1 including the steps of detecting that the user is disconnected, receiving a new request for access and allowing the user access to the protected network resource if the user is recorded as re-entering the restricted area.

9. A method as claimed in claim 1 in which the step of checking whether the user is recorded as being within the restricted area precedes checking the user credentials.

10. An access controller for controlling access to a protected network resource in which the access controller is arranged for connection to a network access point located within a restricted area;
    in which the access controller is arranged to receive a request for access to the protected network resource and user credentials from a user connected to a network via the network access point;
    in which the access controller is arranged to check the user credentials against predetermined user information so as to authenticate the user and to check information from a restricted area access control system as to whether the user is recorded as being within the restricted area;
    in which the access controller is arranged to allow the user access to the protected network resource if the user credentials are authenticated and the user is recorded as being within the restricted area;
    in which the access controller is arranged to monitor the user's network connection and on detecting disconnection of the user from the network, the access controller is arranged to record the user as not located within the restricted area.

11. An access controller as claimed in claim 10 comprising a unit configured to access storage for storing user status information, in which the user status information comprises: information from the restricted area access control system indicating that the user has registered their entry into the restricted area; and information from an authentication system indicating that the credentials supplied by the user have been accepted in which the access controller is arranged to update, upon detecting disconnection of the user from the network, the information from the restricted area access control system to indicate that the user has left the restricted area.

12. An access controller as claimed in claim 10 which the information from the restricted area access control system indicating that the user has registered their entry into the restricted area derives from one of:
    the user passing an access control point to enter the restricted area; and
    the user communicating with the restricted area access control system via a terminal.

13. An access controller as claimed claim 10 arranged, upon determining that the user is recorded as not being within the restricted area, to require additional credentials from the user to support the user's request.

14. An access controller as claimed in claim 10 arranged to record the time of the user's entry into the restricted area and the time of the request and to allow the user access to the protected network resource if the request occurs within a set time period after the entry.

15. A computer network comprising the access controller of claim 10.

16. A non-transitory computer-readable storage medium storing a computer program or suite of computer programs, which upon execution by one or more computers, performs the method steps as set out in claim 1.

17. A system configured to control access to a protected network resource in which the system is arranged for connection to a network access point located within a restricted area, the system comprising:
    a computer configured to:
        receive a request for access to the protected network resource and user credentials from a user connected to a network via the network access point;
        check the user credentials against predetermined user information so as to authenticate the user and check information from a restricted area access control system as to whether the user is recorded as being within the restricted area;
        allow the user access to the protected network resource if the user credentials are authenticated and the user is recorded as being within the restricted area;
        monitor the user's network connection; and
        on detecting disconnection of the user from the network, record the user as not located within the restricted area.

18. A system as in claim 17 wherein the computer is further configured to:
   access storage for storing user status information, in which the user status information comprises: information from the restricted area access control system indicating that the user has registered their entry into the restricted area; and information from an authentication system indicating that the credentials supplied by the user have been accepted in which the computer is further configured to update, upon detecting disconnection of the user from the network, the information from the restricted area access control system to indicate that the user has left the restricted area.

19. The system as in claim 17 wherein the information from the restricted area access control system indicating that the user has registered their entry into the restricted area derives from one of: the user passing an access control point to enter the restricted area, and the user communicating with the restricted area access control system via a terminal.

20. The system as in claim 17 wherein the computer is further configured to, upon determining that the user is recorded as not being within the restricted area, require additional credentials from the user to support the user's request.

21. The system as in claim 17 wherein the computer is further configured to record the time of the user's entry into the restricted area and the time of the request and allow the user access to the protected network resource if the request occurs within a set time period after the entry.

* * * * *